United States Patent
Pickett

Patent Number: 5,958,045
Date of Patent: Sep. 28, 1999

[54] START OF ACCESS INSTRUCTION CONFIGURED TO INDICATE AN ACCESS MODE FOR FETCHING MEMORY OPERANDS IN A MICROPROCESSOR

[75] Inventor: James K. Pickett, Austin, Tex.

[73] Assignee: Advanced Micro Devices, Inc., Sunnyvale, Calif.

[21] Appl. No.: 08/831,194

[22] Filed: Apr. 2, 1997

[51] Int. Cl.[6] .................................................. G06F 9/00
[52] U.S. Cl. .................. 712/229; 712/205; 711/118; 711/142; 711/143
[58] Field of Search .................................. 711/134, 135, 711/140, 133, 144, 145, 118, 119, 120, 121, 123; 395/570, 584, 585, 586, 587, 588, 380, 381, 383

[56] References Cited

U.S. PATENT DOCUMENTS

| | | | |
|---|---|---|---|
| 5,357,618 | 10/1994 | Mirza et al. | 395/400 |
| 5,377,336 | 12/1994 | Eickemeyer et al. | 395/375 |
| 5,627,992 | 5/1997 | Baror | 395/460 |
| 5,649,144 | 7/1997 | Gostin et al. | 395/421.1 |
| 5,701,435 | 12/1997 | Chi | 395/486 |
| 5,751,996 | 5/1998 | Glew et al. | 711/145 |
| 5,790,823 | 7/1995 | Puzak et al. | 395/383 |

OTHER PUBLICATIONS

Pentium Processor Family Developer's Manual vol. 3: Architecture and Programming Manual; pp. 11–18–11–23; 18–1–18–6, Dec. 1995.
PowerPC 601 RISC Microprocessor User's Manual, Motorola Inc. 1993, pp. 10–42, 10–43.

*Primary Examiner*—William M. Treat
*Assistant Examiner*—Kimberley N. McLean
*Attorney, Agent, or Firm*—Conley, Rose & Tayon; Lawrence J. Merkel; B. Noel Kivlin

[57] ABSTRACT

A microprocessor is provided which supports a start of access instruction. Upon execution of the start of access instruction, the microprocessor establishes a local access mode provided by the instruction. Memory operands fetched for instructions subsequent to the start of access instruction (in program order) are fetched in accordance with the local access mode. Memory operands fetched for instructions prior to the start of access instruction are fetched in accordance with a global access mode established for each page of memory.

18 Claims, 8 Drawing Sheets

| Mode | Access Results |
|---|---|
| CL | Fetch read misses into Data Cache. |
| SD | Fetch read misses into Line Buffer, but not into Data Cache. Write misses are stored into Main Memory. |
| NC | Fetch from memory, do not update Data Cache. |
| WT | Write misses stored directly into Main Memory. |
| WU | Write allocate into Data Cache. |
| ST | Prefetch cache lines using provided stride value. |

68

FIG. 6
FIG. 7

START OF ACCESS INSTRUCTION CONFIGURED TO INDICATE AN ACCESS MODE FOR FETCHING MEMORY OPERANDS IN A MICROPROCESSOR

BACKGROUND OF THE INVENTION

1. Field of the Invention

This invention relates to the field of microprocessors and, more particularly, to memory operand fetching within microprocessors.

2. Description of the Related Art

Superscalar microprocessors achieve high performance by executing multiple instructions per clock cycle and by choosing the shortest possible clock cycle consistent with the design. On the other hand, superpipelined microprocessor designs divide instruction execution into a large number of subtasks which can be performed quickly. A pipeline stage is assigned to each subtask. By overlapping the execution of many instructions within the pipeline, superpipelined microprocessors attempt to achieve high performance. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Although the pipeline may be divided into any number of stages at which portions of instruction processing are performed, instruction processing generally comprises fetching the instruction, decoding the instruction, executing the instruction, and storing the execution results in the destination identified by the instruction.

Superscalar microprocessors demand high memory bandwidth due to the number of instructions executed concurrently and due to the increasing clock frequency (i.e. shortening clock cycle) employed by the superscalar microprocessors. Many of the instructions include memory operations to fetch (read) and update (write) memory operands in addition to the operation defined for the instruction. The memory operands must be fetched from or conveyed to memory, and each instruction must originally be fetched from memory as well. Similarly, superpipelined microprocessors demand high memory bandwidth because of the high clock frequency employed by these microprocessors and the attempt to begin execution of a new instruction each clock cycle. It is noted that a given microprocessor design may employ both superscalar and superpipelined techniques in an attempt to achieve the highest possible performance characteristics.

Microprocessors are often configured into computer systems which have a relatively large, relatively slow main memory. Typically, multiple dynamic random access memory (DRAM) modules comprise the main memory system. The large main memory provides storage for a large number of instructions and/or a large amount of data for use by the microprocessor, providing faster access to the instructions and/or data then may be achieved from a disk storage, for example. However, the access times of modern DRAMs are significantly longer than the clock cycle length of modern microprocessors. The memory access time for each set of bytes being transferred to the microprocessor is therefore long. Accordingly, the main memory system is not a high bandwidth system. Microprocessor performance may suffer due to a lack of available memory bandwidth.

In order to relieve the bandwidth requirements on the main memory system, microprocessors typically employ one or more caches to store the most recently accessed data and instructions. Caches perform well when the microprocessor is executing programs which exhibit locality of reference. Particularly with respect to data (i.e. memory operands used by instructions), many programs have memory access patterns which exhibit locality of reference. A memory access pattern exhibits locality of reference if a memory operation to a particular byte of main memory indicates that memory operations to other bytes located within the main memory at addresses near the address of the particular byte are likely. Generally, a "memory access pattern" is a set of consecutive memory operations performed in response to a program or a code sequence within a program. The addresses of the memory operations within the memory access pattern may have a relationship to each other. For example, the memory access pattern may or may not exhibit locality of reference.

When programs exhibit locality of reference, cache hit rates (i.e. the percentage of memory operations for which the requested byte or bytes are found within the caches) are high and the bandwidth required from the main memory is correspondingly reduced. When a memory operation misses in the cache, the cache line (i.e. a block of contiguous data bytes) including the accessed data is fetched from main memory and stored into the cache. A different cache line may be discarded from the cache to make room for the newly fetched cache line.

Unfortunately, certain code sequences (for example, certain loops) within a program may have a memory access pattern which does not exhibit locality of reference or which may otherwise hamper the ability of the cache to relieve the bandwidth required from the main memory. For example, code sequences may access a datum once and not return to access that datum or other data within the same cache line as the datum (in other words, the code sequence may not exhibit locality of reference). If the datum misses in the cache, the cache line containing the datum is fetched from main memory and stored into the cache. Another cache line of data which may be accessed again in the future may be discarded from the cache to store the newly fetched cache line, even though the newly fetched cache line is not going to be accessed again in the near future.

In other cases, a microprocessor may be configured to convey a write memory operation which misses the cache to the main memory for storage without allocating storage in the cache for the cache line corresponding to the write memory operation. However, the cache line to which the write memory operation is directed may be accessed again within the code sequence. Since the cache line is not allocated and stored into the cache, the subsequent accesses miss the cache also.

SUMMARY OF THE INVENTION

The problems outlined above are in large part solved by a microprocessor in accordance with the present invention. The microprocessor supports a start of access instruction. Upon execution of the start of access instruction, the microprocessor establishes a local access mode provided by the instruction. Memory operands fetched for instructions subsequent to the start of access instruction (in program order) are fetched in accordance with the local access mode.

Memory operands fetched for instructions prior to the start of access instruction are fetched in accordance with a global access mode established for each page of memory.

Advantageously, a local access mode can be established for a code sequence which does not exhibit locality of reference or which otherwise hampers the effectiveness of the caches in relieving main memory bandwidth requirements. Memory operand fetching within the code sequence is either performed in a manner which increases the cache hit rates for the memory operations within the code sequence or in a manner which decreases the discard of cache lines used by other portions of the program. Increasing the cache hit rates of the code sequence may decrease the number of clock cycles elapsing during executing of the code sequence (e.g. increase the performance of the code sequence execution). On the other hand, decreasing the number of stored cache lines which are later used by the other portions of the program increases the execution performance of those other portions. Overall performance of the microprocessor executing the program may thereby be increased.

Broadly speaking, the present invention contemplates a method for providing specialized fetching of memory operands for a particular code sequence executed in a microprocessor. A start of access instruction is executed within the microprocessor prior to executing the particular code sequence. The start of access instruction provides a local access mode indicative of a memory access pattern within the particular code sequence. Memory operands are fetched in response to the local access mode.

The present invention further contemplates a microprocessor comprising a data cache and a load/store unit. Coupled to the data cache, the load/store unit is configured to convey an address and an access mode corresponding to a memory operation to the data cache. The access mode determines a cache policy corresponding to the address. The load/store unit is configured to generate the access mode in response to a global access mode corresponding to a page containing the address and a local access mode provided by a start of access instruction.

Furthermore, the present invention contemplates a load/store unit for performing memory operations to a data cache, comprising an access mode control register and an access mode generation unit. The access mode control register is configured to store a local access mode indicative of a memory access pattern within a particular code sequence. Coupled to the access mode control register, the access mode generation unit is also coupled to receive a global access mode corresponding to a page containing an address of a particular memory operation. The access mode generation unit is configured to generate an access mode corresponding to the particular memory operation from the local access mode and the global access mode. The access mode determines a caching policy corresponding to the address.

BRIEF DESCRIPTION OF THE DRAWINGS

Other objects and advantages of the invention will become apparent upon reading the following detailed description and upon reference to the accompanying drawings in which:

FIG. 6 is a block diagram of a page table entry illustrating a portion of one embodiment of a global access mode.

FIG. 7 is a block diagram of a memory type range register illustrating another portion of one embodiment of the global access mode.

Figure 1:
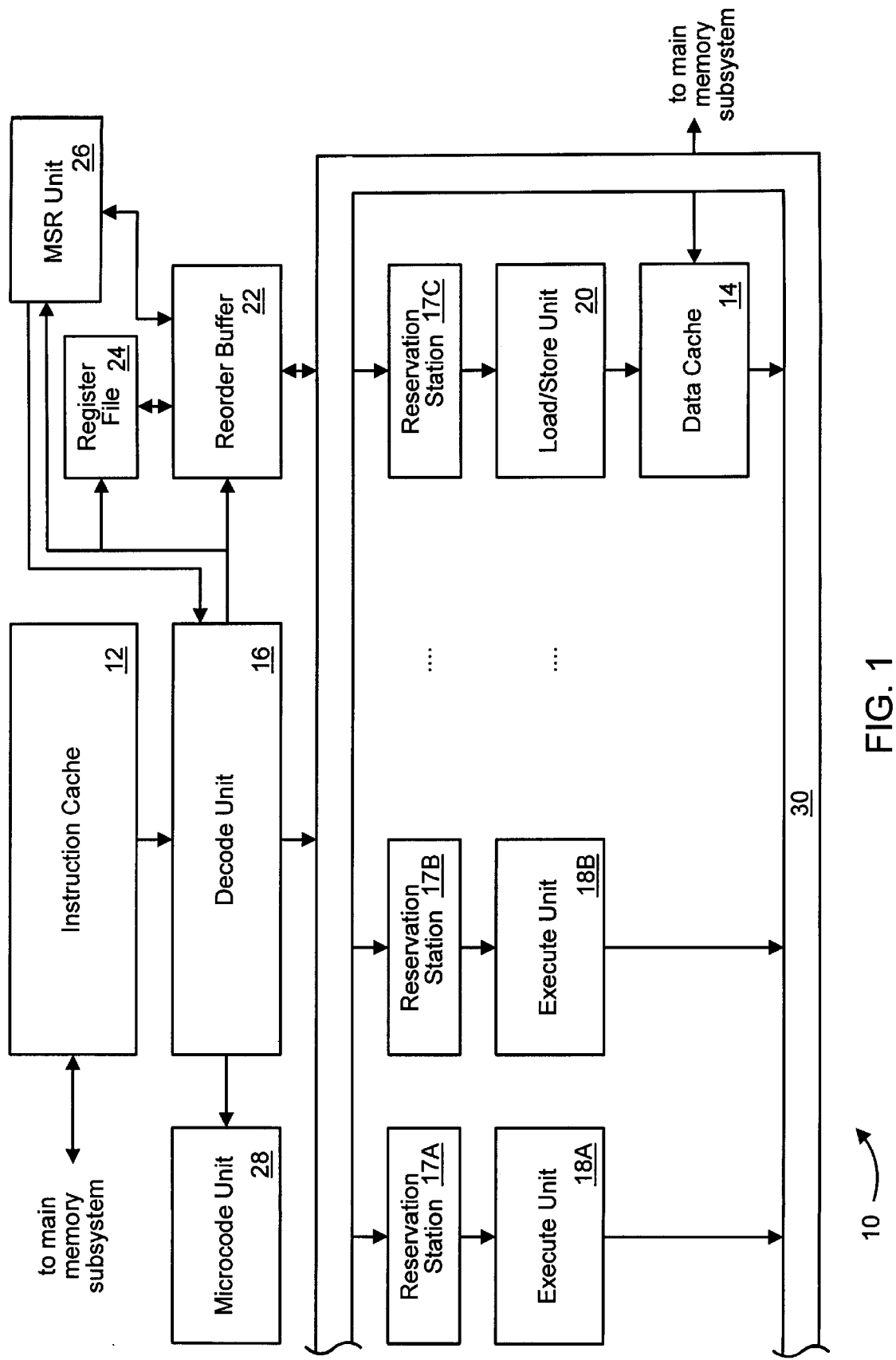
FIG. 1 is a block diagram of one embodiment of a superscalar microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Microprocessor 10 includes an instruction cache 12, a data cache 14, a decode unit 16, a plurality of reservation stations including reservation stations 17A, 17B, and 17C, a plurality of execute units including execute units 18A and 18B, a load/store unit 20, a reorder buffer 22, a register file 24, a model specific register (MSR) unit 26, and a microcode unit 28. Elements referred to herein with a particular reference number followed by a letter will be collectively referred to by the reference number alone. For example, the plurality of execute units will be collectively referred to herein as execute units 18. Execute units 18 may include more execute units than execute units 18A and 18B shown in FIG. 1. Additionally, an embodiment of microprocessor 10 may include one execute unit 18.

As shown in FIG. 1, instruction cache 12 is coupled to a main memory subsystem (not shown) and to a decode unit 16, which is further coupled to reservation stations 17, reorder buffer 22, register file 24, MSR unit 26, and microcode unit 28. Reorder buffer 22, execute units 18, and data cache 14 are each coupled to a result bus 30 for forwarding of execution results. Furthermore, each reservation station 17A and 17B is coupled to a respective execute unit 18A and 18B, while reservation station 17C is coupled to load/store unit 20. Each reservation station 17 is coupled to receive operand information from reorder buffer 22. Load/store unit 20 is coupled to data cache 14, which is further coupled to the main memory subsystem. Finally, MSR unit 26 and register file 24 are coupled to reorder buffer 22.

Generally speaking, microprocessor 10 is configured to execute a start of access instruction which establishes a local access mode in load/store unit 20. Microprocessor 10 generally handles operand fetching under the control of a global access mode established for the various pages of main memory via translation facilities within microprocessor 10. The global access mode is generally suitable for the program being executed as a whole, but may not be suitable for certain code sequences (e.g. loops having a particular memory access pattern which does not perform well using the global access mode). Prior to such code sequences, the program may include a start of access instruction which specifies a local access mode for the code sequence. Optionally, a second start of access instruction may follow the code sequence to deactivate the local access mode. While the local access mode may perform well for the memory operations within the code sequence, the local access mode may not be generally suitable for the program containing the code sequence.

When load/store unit 20 executes a memory operation, the access mode used for that memory operation is generated in accordance with the global access mode and the local access mode (if a start of access instruction has been executed). Generally speaking, an "access mode" defines the reaction of load/store unit 20 and data cache 14 to the memory operation. The access mode may determine the caching policy for the cache line containing the accessed datum, as well as any prefetching which may be generated in response to the memory operation. A caching policy generally determines the response of the cache to a hit or miss corresponding to the memory operation. The cache policy determines whether or not a cache miss is fetched into data cache 14 in response to a read or write memory operation. The choice to fetch the cache line may be different for read memory operations than for write memory operations in a given caching policy. Additionally, the caching policy determines if write memory operations are treated as writethrough or writeback operations.

A global access mode, as used herein, is an access mode defined for a page of main memory as part of the translation facilities employed by microprocessor 10. Generally, a "page" is a block of memory including each byte for which the corresponding address identifying the byte within the memory is translated by a single translation entry within the address translation mechanism employed by microprocessor 10. In one embodiment, a page is 4 kilobytes in size, but any size page may be employed by different embodiments. A local access mode, as used herein, is an access mode established via execution of a start of access instruction.

The start of access instruction may be used to establish a local access mode which efficiently uses data cache 14 to store data used by a code sequence, where the global access mode may not lead to efficient use of the cache. For example, under the global access mode, a write memory operation which misses data cache 14 may be defined to perform a writethrough operation and data cache 14 may not fetch the cache line containing the datum updated by the write memory operation. Such a global access mode may be selected if most of the write memory operations performed by a program which miss data cache 14 do not exhibit locality of reference. Alternatively, such a global access mode may be selected if most of the write memory operations hit in the cache (i.e. because a datum within the cache line was previously accessed via a read memory operation). However, a code sequence within the program may perform many write memory operations which miss data cache 14 and subsequently read or write the corresponding cache lines. By establishing a local access mode which does fetch the corresponding cache line in response to a write miss, the cache lines are fetched and the cache hit rate of the code sequence may be increased. Other examples of using a local access mode to increase the efficiency of data cache 14 for a particular code sequence are described below.

Alternatively, a local access mode may be used to prohibit fetching cache lines into data cache 14 in response to memory operations performed within a code sequence. While many of the memory operations within the code sequence may be fetched from main memory using such a local access mode, the data stored in data cache 14 upon initiating the code sequence may remain stored therein upon completion of the code sequence. If the data accessed by the code sequence is not accessed by other portions of the program, the overall cache efficiency for the program may be increased. Each cache line fetched into data cache 14 generally displaces a cache line already stored within data cache 14. If the cache line that would be displaced stores data later accessed by the program and the cache line including the datum being fetched does not contain data later accessed by the program, overall cache efficiency is increased by not displacing the stored cache line. Load/store unit 20 may implement a line buffer for temporarily storing cache lines fetched in response to memory operations within the code sequence. The cache lines in the line buffer do not displace cache lines from data cache 14. Overall execution speed of the program may similarly be increased by using a local access mode to avoid the discard of stored cache lines in favor of cache lines accessed by the code sequence. It is noted that discard of cache lines to be accessed later in favor of cache lines which are not accessed again is referred to as "cache pollution".

In one embodiment, microprocessor 10 is configured to reassign the operation performed by a given instruction when an instruction redefinition mode is enabled. The reassigned operation comprises the start of access operation. Microprocessor 10 employs a model specific register (MSR) within MSR unit 26 for storing an indication that the start of access instruction is selected as the operation for the redefinable instruction. Using a write MSR instruction, an application program can redefine an instruction to perform a start of access operation. Advantageously, the start of access instruction can be added to the instruction set without consuming the undefined opcodes (if any). Furthermore, the start of access instruction can be added to an instruction set in which all of the opcodes have been consumed. It is noted that, according to another embodiment multiple redefinable instructions may be preselected. The value in the MSR may indicate which of the multiple redefinable instructions is selected by the application program to be the start of access instruction.

Decode unit 16 is coupled to receive signals from MSR unit 26 which represent the instruction redefinitions. For each instruction which microprocessor 10 allows to be redefined, decode unit 16 produces a first decoded instruction which causes execute units 18 and/or load/store unit 20 to perform the architecturally defined operation assigned to the instruction if the signals indicate that the instruction has not been redefined via an update to the corresponding MSR. Alternatively, decode unit 16 produces a second decoded instruction which causes execute units 18 and/or load/store unit 20 to perform a start of access operation if the signals indicate that the instruction has been redefined via an update to the corresponding MSR. According to one embodiment, instruction redefinition is enabled via a redefinition enable flag stored in a status flags register. If the redefinition enable flag is not set, then the signals from MSR unit 26 are ignored by decode unit 16 and decode unit 16 produces the first decoded instruction. Alternatively, execute units 18 may be coupled to receive the signals from MSR unit 26 and may change execution of the instruction in response to those signals.

MSR unit 26 comprises a plurality of model specific registers. Generally speaking, model specific registers are used to control features which are part of the implementation of microprocessor 10 but which are not part of the microprocessor architecture employed by microprocessor 10. For example, debug features supported by microprocessor 10 may be controlled by model specific registers. Additionally, performance monitoring features may be controlled via model specific registers. According to the present embodiment of microprocessor 10, a model specific register is assigned to store instruction redefinition controls.

According to one embodiment, microprocessor 10 employs the x86 microprocessor architecture. The x86 microprocessor architecture employs MSRs, with a RDMSR instruction for reading the MSRs and a WRMSR instruction for writing the MSRs. The RDMSR and WRMSR instructions are defined as privileged instructions in the x86 microprocessor architecture. Microprocessor 10, on the other hand, does not treat the RDMSR and WRMSR instructions as privileged if the MSR being updated is the MSR which stores instruction redefinition information. If that MSR is being updated or read, the WRMSR or RDMSR instruction is executed as nonprivileged. Otherwise, the instruction is executed as privileged. Although the x86 microprocessor architecture is employed by one embodiment of microprocessor 10, other embodiments may employ different microprocessor architectures.

Instruction cache 12 is a high speed cache memory for storing instructions. It is noted that instruction cache 12 may be configured into a set-associative or direct mapped configuration. Instruction cache 12 may additionally include a branch prediction mechanism for predicting branch instructions as either taken or not taken. Instructions are fetched from instruction cache 12 and conveyed to decode unit 16 for decode and dispatch to a reservation station 17.

Decode unit 16 decodes each instruction fetched from instruction cache 12. Decode unit 16 dispatches the instruction to one or more of reservation stations 17 depending upon the type of instruction detected. More particularly, decode unit 16 produces a decoded instruction in response to each instruction fetched from instruction cache 12. The decoded instruction comprises control signals to be used by execute units 18 and/or load/store unit 20 to execute the instruction. For example, if a given instruction includes a memory operand, decode unit 16 may signal load/store unit 20 to perform a load/store (i.e. read/write) memory operation in response to the given instruction.

Decode unit 16 also detects the register operands used by the instruction and requests these operands from reorder buffer 22 and register file 24. In one embodiment, execute units 18 are symmetrical execution units. Symmetrical execution units are each configured to execute a particular subset of the instruction set employed by microprocessor 10. The subsets of the instruction set executed by each of the symmetrical execution units are the same. In another embodiment, execute units 18 are asymmetrical execution units configured to execute dissimilar instruction subsets. For example, execute units 18 may include a branch execute unit for executing branch instructions, one or more arithmetic/logic units for executing arithmetic and logical instructions, and one or more floating point units for executing floating point instructions. Decode unit 16 dispatches an instruction to a reservation station 17 which is coupled to an execute unit 18 or load/store unit 20 which is configured to execute that instruction.

Microcode unit 28 is included for handling instructions for which the architecturally defined operation is more complex than the hardware employed within execute units 18 and load/store unit 20 may handle. Microcode unit 28 parses the complex instruction into multiple instructions which execute units 18 and load/store unit 20 are capable of executing. Additionally, microcode unit 28 may perform functions employed by microprocessor 10. For example, microcode unit 28 may perform instructions which represent a context switch. Generally speaking, the "context" of a program comprises the state needed to correctly run that program. Register values created by the program are included in the context, as are the values stored in any memory locations used by the program. Microcode unit 28 causes the context stored within microprocessor 10 to be saved to memory at a predefined memory location (according to the microprocessor architecture employed by microprocessor 10) and restores the context of the program being initiated. Context switches may occur in response to an interrupt being signalled to microprocessor 10, for example.

Load/store unit 20 provides an interface between execute units 18 and data cache 14. Load and store memory operations are performed by load/store unit 20 to data cache 14. Additionally, memory dependencies between load and store memory operations are detected and handled by load/store unit 20.

Reservation stations 17 are configured to store instructions whose operands have not yet been provided. An instruction is selected from those stored in a reservation station 17A–17C for execution if: (1) the operands of the instruction have been provided, and (2) the instructions within the reservation station 17A–17C which are prior to the instruction being selected in program order have not yet received operands. It is noted that a centralized reservation station may be included instead of separate reservations stations. The centralized reservation station is coupled between decode unit 16, execute units 18, and load/store unit 20. Such an embodiment may perform the dispatch function within the centralized reservation station.

Microprocessor 10 supports out of order execution, and employs reorder buffer 22 for storing execution results of speculatively executed instructions and storing these results into register file 24 in program order, for performing dependency checking and register renaming, and for providing for mispredicted branch and exception recovery. When an instruction is decoded by decode unit 16, requests for register operands are conveyed to reorder buffer 22 and register file 24. In response to the register operand requests, one of three values is transferred to the reservation station 17A–17C which receives the instruction: (1) the value stored in reorder buffer 22, if the value has been speculatively generated; (2) a tag identifying a location within reorder buffer 22 which will store the result, if the value has not been speculatively generated; or (3) the value stored in the register within register file 24, if no instructions within reorder buffer 22 modify the register. Additionally, a storage location within reorder buffer 22 is allocated for storing the results of the instruction being decoded by decode unit 16. The storage location is identified by a tag, which is conveyed to the unit receiving the instruction. It is noted that, if more than one reorder buffer storage location is allocated for storing results corresponding to a particular register, the value or tag corresponding to the last result in program order is conveyed in response to a register operand request for that particular register.

When execute units 18 or load/store unit 20 execute an instruction, the tag assigned to the instruction by reorder buffer 22 is conveyed upon result bus 30 along with the result of the instruction. Reorder buffer 22 stores the result in the indicated storage location. Additionally, reservation stations 17 compare the tags conveyed upon result bus 30 with tags of operands for instructions stored therein. If a match occurs, the unit captures the result from result bus 30 and stores it with the corresponding instruction. In this manner, an instruction may receive the operands it is intended to operate upon. Capturing results from result bus 30 for use by instructions is referred to as "result forwarding".

Instruction results are stored into register file 24 by reorder buffer 22 in program order. Storing the results of an instruction and deleting the instruction from reorder buffer 22 is referred to as "retiring" the instruction. By retiring the instructions in program order, recovery from incorrect speculative execution may be performed. For example, if an instruction is subsequent to a branch instruction whose taken/not taken prediction is incorrect, then the instruction may be executed incorrectly. When a mispredicted branch instruction or an instruction which causes an exception is detected, reorder buffer 22 discards the instructions subsequent to the mispredicted branch instructions. Instructions thus discarded are also flushed from reservation stations 17, execute units 18, load/store unit 20, and decode unit 16.

Register file 24 includes storage locations for each register defined by the microprocessor architecture employed by microprocessor 10. For example, microprocessor 10 may employ the x86 microprocessor architecture. For such an embodiment, register file 24 includes locations for storing the EAX, EBX, ECX, EDX, ESI, EDI, ESP, and EBP register values.

Data cache 14 is a high speed cache memory configured to store data to be operated upon by microprocessor 10. It is noted that data cache 14 may be configured into a set-associative or direct-mapped configuration.

The main memory subsystem effects communication between microprocessor 10 and devices coupled thereto. For example, instruction fetches which miss instruction cache 12 may be transferred from a main memory by the main memory subsystem. Similarly, data requests performed by load/store unit 20 which miss data cache 14 may be transferred from main memory by the main memory subsystem. Additionally, data cache 14 may discard a cache line of data which has been modified by microprocessor 10. The main memory subsystem transfers the modified line to the main memory.

It is noted that decode unit 16 may be configured to dispatch an instruction to more than one execution unit. For example, in embodiments of microprocessor 10 which employ the x86 microprocessor architecture, certain instructions may operate upon memory operands. Executing such an instruction involves transferring the memory operand from data cache 14, executing the instruction, and transferring the result to memory (if the destination operand is a memory location) or data cache 14. Load/store unit 20 performs the memory operations, and an execute unit 18 performs the execution of the instruction.

Figure 2:
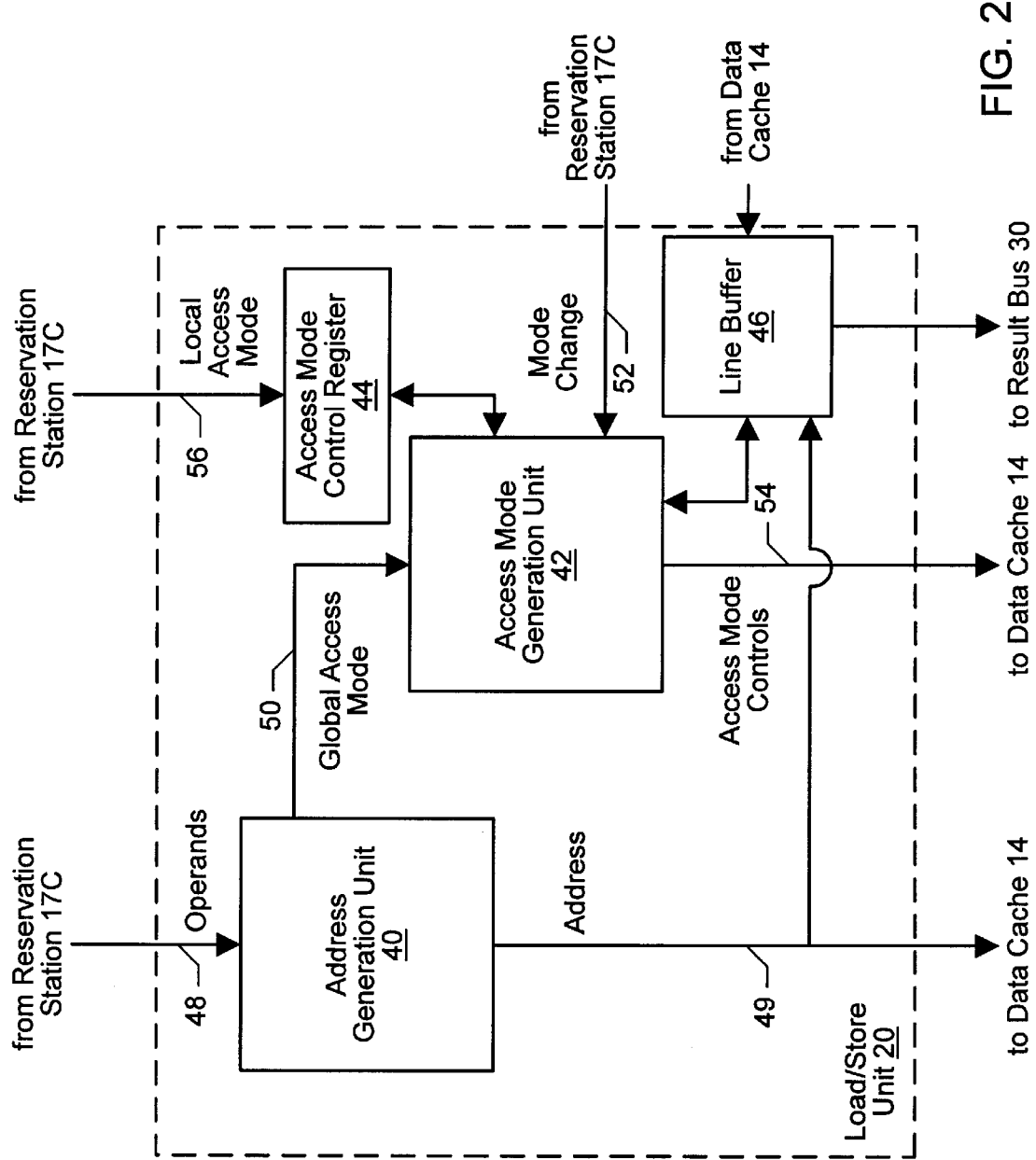
FIG. 2 is a block diagram of one embodiment of a load/store unit shown in FIG. 1.

Turning now to FIG. 2, a block diagram of one embodiment of load/store unit 20 is shown. Other implementations of load/store unit 20 are also contemplated. As shown in FIG. 2, load/store unit 20 includes an address generation unit 40, an access mode generation unit 42, an access mode control register 44, and a line buffer 46. Address generation unit 40 is coupled to an operands bus 48 which is also coupled to reservation station 17C. Additionally, address generation unit 40 is coupled to an address bus 49 which is coupled to data cache 14 and line buffer 46. Access mode generation unit 42 is coupled to a mode change line 52 from reservation station 17C, a global access mode bus 50 from address generation unit 40, access mode control register 44 and line buffer 46. Furthermore, access mode generation unit 42 is coupled to an access mode controls bus 54 which is coupled to data cache 14. Access mode control register 44 is coupled to a local access mode bus 56 which is further coupled to reservation station 17C. Finally, line buffer 46 is coupled to receive a cache line from data cache 14 and is coupled to provide data upon result bus 30.

When reservation station 17C provides a memory operation for execution to load/store unit 20, addressing operands (e.g. register values and displacements) are conveyed to address generation unit 40 to generate the address of the memory operation. The generated address is provided upon address bus 49 to data cache 14. Additionally, the type of access (read/write) may be conveyed on address bus 49 as well. Address generation unit 40 generates the address by adding the address operands and then translating the address in accordance with the translation mechanism employed by microprocessor 10. For example, address generation unit 40 may include a translation lookaside buffer (TLB) for storing address translation information regarding a plurality of pages. Address generation unit 40 provides the global access mode corresponding to the memory operation (detected during the S address translation) via global access mode bus 50. Exemplary global access mode information is provided below.

Access mode generation unit 42 generates access mode controls for a memory operation in response to the global access mode for the memory operation and a local access mode stored in access mode control register 44. Generally, if a local access mode is active in access mode control register 44, access mode generation unit 42 generates access mode controls in response to the local access mode. If a local access mode is not active in access mode control register 44, the access mode controls reflect the global access mode. According to one embodiment, a local access mode is not active in access mode control register 44 if access mode control register 44 is coded to binary zeros. The access mode controls provided to data cache 14 direct the operation of data cache 14 in response to the memory operation. For example, the access mode controls may dictate the cacheability of the cache line accessed by the memory operation, the writethrough/writeback nature of write memory operations, fetching of a cache line in response to a cache miss by a read memory operation, fetching of a cache line in response to a cache miss by a write memory operation, and whether a fetched cache line should be stored within data cache 14 or line buffer 46, among others.

Decode unit 16 is configured to dispatch start of access instructions to reservation station 17C in addition to memory operations. Upon selecting a start of access instruction for execution, reservation station 17C asserts a mode change signal upon mode change line 52 to access mode generation unit 42 and conveys the local access mode provided by the start of access instruction upon local access mode bus 56. Access mode generation unit 42 causes access mode control register 44 to store the local access mode provided upon local access mode bus 56 upon assertion of the mode change signal. Alternatively, mode change line 52 may be coupled to access mode control register 44 and access mode control register 44 may be configured to store the provided local access mode upon assertion of the mode change signal.

Certain local access modes cause data cache 14 not to fetch a cache line containing the datum accessed by a memory operation if the cache line is not already stored in data cache 14. These local access modes are used if the data accessed by the memory operation is not likely to be accessed again by the program including the code sequence.

However, the data may be accessed by the code sequence corresponding to the local access mode. Line buffer 46 is included for storing cache lines which are not placed into data cache 14 in response to a local access mode. When a cache line which is not to be stored into data cache 14 due to a particular local access mode is received from the main memory system by data cache 14, data cache 14 transmits the cache line to line buffer 46. Line buffer 46 stores the cache line as well as a tag identifying the main memory address corresponding to the cache line. Line buffer 46 may comprise storage for one or more cache lines, according to various embodiments. If multiple cache lines are configured into line buffer 46, line buffer 46 may operate as a first-in, first-out queue, for example.

Address bus 49 is coupled to line buffer 46 in order to search line buffer 46 in parallel with data cache 14. If line buffer 46 detects a hit for a read memory operation, line buffer 46 provides the requested datum via result bus 30 instead of data cache 14 providing the requested datum. Data cache 14 cancels activities for a memory operation if line buffer 46 responds to the memory operation. Line buffer 46 advantageously allows temporary storage of cache lines which may be repeatedly used by a code sequence but not by the remainder of the program including the code sequence.

As mentioned above, access mode generation unit 42 generally provides access mode controls to data cache 14 which correspond to the local access mode if the local access mode is active. However, access mode generation unit 42 does not allow the local access mode to override (or "violate") a restriction imposed by the global access mode. For example, if the global access mode specifies that the address corresponding to a memory operation is non-cacheable (i.e. not to be stored in data cache 14), then a local access mode which specifies caching of the cache line accessed by the memory operation is ignored. Similarly, if the global access mode specifies that the address is writethrough, then a local access mode specifying writeback operation is ignored. Generally, the global access mode is determined by an operating system or other controlling program, while application programs under the control of the operating system may generate local access modes. Therefore, allowing a local access mode to override a restriction of the global access mode would essentially allow an application program to circumvent operating system controls. Access mode generation unit 42 is designed to avoid such a circumvention.

It is noted that, according to another embodiment, load/store unit 20 may comprise a load/store buffer for storing read and write memory operations. Reservation station 17C may be deleted in such an embodiment, and address generation may be performed by execute units 18B.

It is noted that the start of access instruction is a software "hint" type instruction. The start of access instruction indicates a method for handling subsequent memory operations, but a particular microprocessor is not required to heed the indication. Furthermore, the start of access instruction does not modify any architectural state (e.g. program visible state).

Figure 3:
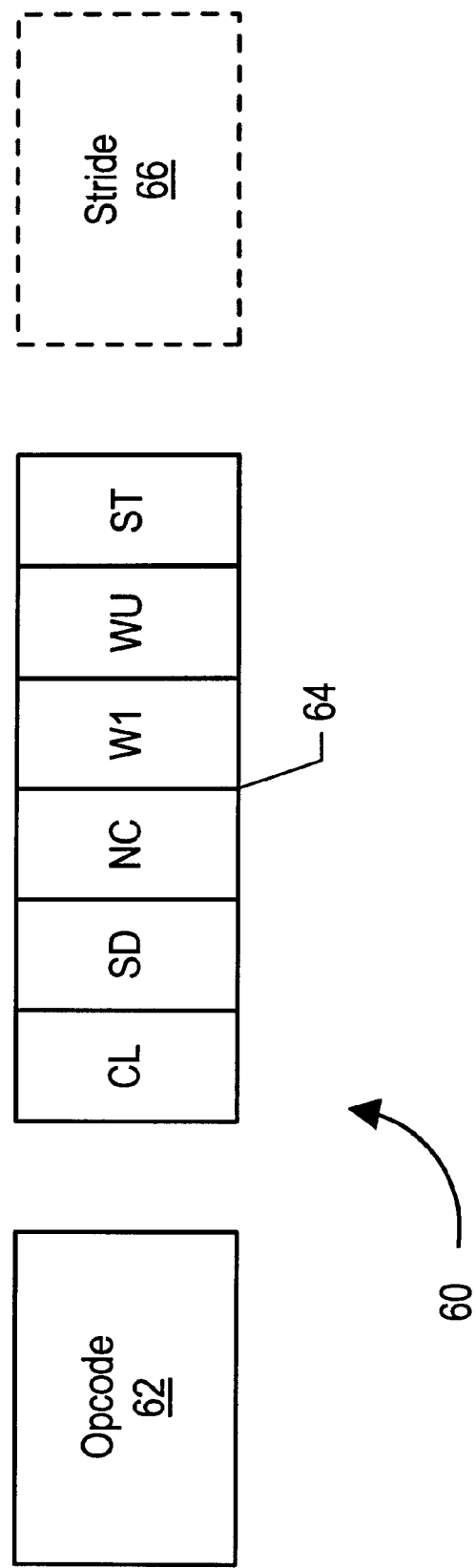
FIG. 3 is a block diagram of an exemplary start of access instruction.

Turning now to FIG. 3, an exemplary start of access instruction 60 is shown. Start of access instruction 60 may be employed within the x86 microprocessor architecture, for example. The opcode of the instruction is encoded as one of the previously unassigned opcodes bytes. It is noted that the start of access instruction may also be implemented by redefining the instruction assigned to a particular opcode encoding, as explained in more detail below. If start of access instruction 60 is employed, decode unit 16 directly decodes opcode field 62 and instruction redefinition mode is not employed for the start of access instruction.

Start of access instruction 60 includes an opcode field 62, an access mode field 64, and an optional stride field 66. Opcode field 62 contains the opcode identifying the start of access instruction. Access mode field 64 includes an encoding of the local access mode desired for the code sequence following the start of access instruction. Stride field 66 encodes a stride value for use with the stride access mode. According to one embodiment, each field 62, 64, and 66 comprises a byte.

Access mode field 64 is shown in FIG. 3 divided into a number of bits. Less than eight bits are shown in FIG. 3. The remaining bits in the byte comprising access mode field 64 (according to the above embodiment) are reserved. As shown in FIG. 3, access mode field 64 includes a mode bit for each local access mode. If a given mode bit is set, the corresponding local access mode is enabled. If a given mode bit is clear, the corresponding local access mode is disabled. Generally speaking, a local access mode is enabled if access mode field 64 is encoded into an enabled state for that local access mode. For example, access mode field 64 may be an encoded field in which each different encoding of the field as a whole selects a different local access mode.

Although start of access instruction 60 as shown in FIG. 3 provides the local access mode via an immediate field, other embodiments of the start of access instruction 60 may provide the local access mode via any operand specification. For example, the local access mode could be stored in a register or a memory location.

Figure 4:
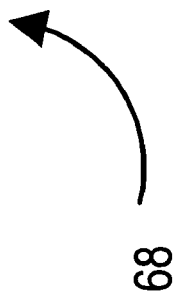
FIG. 4 is a table illustrating one embodiment of a local access mode.

FIG. 4 is a table 68 listing the mode bits shown in access mode field 64 of FIG. 3. The modes comprise: cacheable loads (CL), streaming data (SD), non-cacheable (NC), write-once (W1), write/use (WU), and stride (ST). The CL local access mode is used if cacheable loads are the predominant memory access pattern within the code sequence. In CL mode, read memory operations which miss data cache 14 are fetched into data cache 14. Write memory operations which miss are either fetched into data cache 14 or are performed as a writethrough operation, depending upon the global access mode settings. Both read and write memory operations which hit in data cache 14 are treated as normal cache hits.

The SD local access mode is used if streaming data accesses are the predominant memory access pattern within the code sequence. Streaming data accesses are accesses in which a particular datum is accessed once. Additionally, subsequent accesses are to data which is stored in consecutive memory locations to the data accessed first. Read and write memory access which hit data cache 14 are treated as normal cache hit operations. However, a read memory operation which misses data cache 14 does not cause the corresponding cache line to be stored into data cache 14. Since the data is likely to be accessed only once, storing the data into data cache 14 may cause cache pollution. However, since data stored in consecutive memory locations is likely to be accessed once, the corresponding cache line is stored into line buffer 46. Write memory operations which miss are stored to main memory. If the global access mode allows write combining, the write memory operations may be accumulated in a write buffer (not shown) for bursting to main memory.

If the predominant memory access pattern within a code sequence are non-cacheable type accesses, then the NC local access mode may be used. In the NC local access mode, accesses are treated as non-cacheable. Data cache 14 is not consulted for memory accesses, nor is data cache 14 updated.

The W1 mode is used for memory access patterns in which a write memory operation is typically performed and then the updated datum is not referenced again. In the W1 mode, read memory operations are performed according to the global access mode. Write memory operations are stored into the cache if a cache hit, and written through to memory if a cache miss.

If the predominant memory access pattern in the code sequence is to write a datum, and to later in the code sequence use the written datum as an operand, the WU local access mode may be used. In the WU mode, read memory operations are performed as specified by the global access mode. Write memory operations which hit data cache 14 are treated as normal write hits. Write misses, on the other hand, perform a write allocate operation (i.e. the corresponding cache line is fetched from memory and stored into data cache 14; and the updated datum provided by the write memory operation is also stored into the line). In this manner, the updated datum is available in data cache 14 for subsequent use.

If a code sequence performs a sequence of memory operations in which the addresses are separated by a fixed stride value (i.e. each address and the address immediately following that address, when subtracted, equal the stride), then the ST local access mode is used. When the ST local access mode is selected in start of access instruction 60, the start of access instruction includes stride field 66. The stride value is encoded therein. In the ST mode, when a cache miss is detected, data cache 14 fetches the cache line which misses and begins prefetching cache lines which contain the byte corresponding to the miss address added to the stride value.

Figure 5:
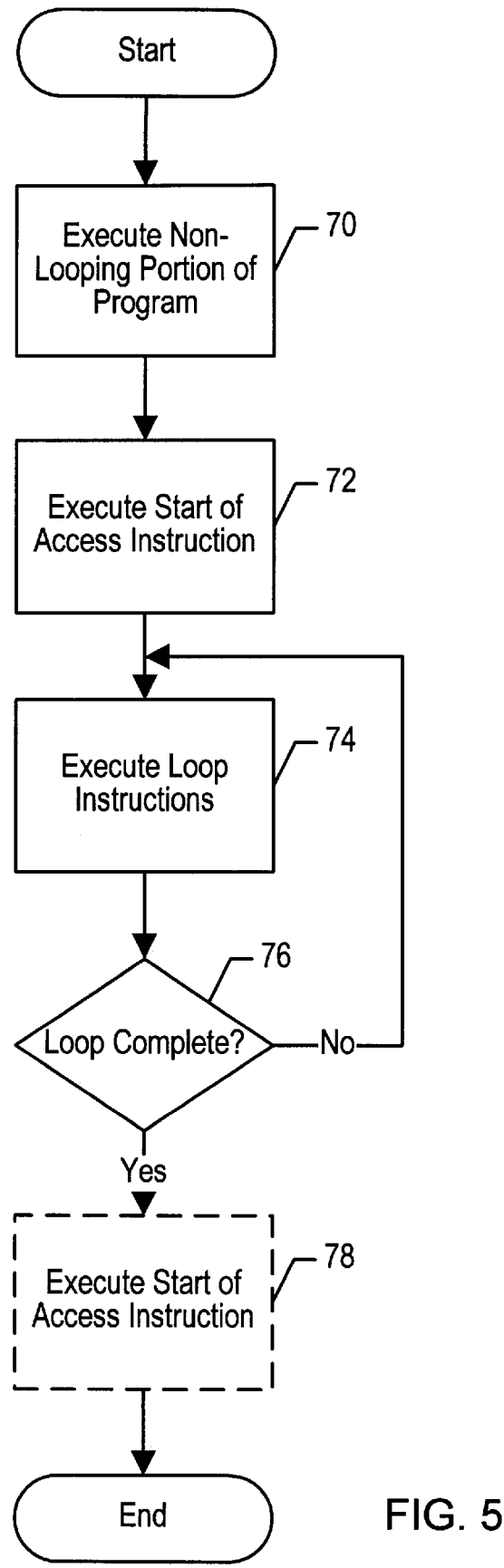
FIG. 5 is a flowchart illustrating an exemplary use of the start of access instruction in a program.

Turning now to FIG. 5, a timing diagram illustrating the use of the start of access instruction in an exemplary program is shown. The exemplary program has a code sequence (a loop) which exhibits a memory access pattern which may benefit from the use of a local access mode different from the access mode which is desirable for the remainder of the program (i.e. the global access mode).

The program beings execution without an active local access mode (step 70). Since the local access mode is inactive, the global access mode controls the fetching of memory operands. Prior to executing the loop, a start of access instruction is executed (step 72). The start of access instruction executed at step 72 establishes the local access mode which is desired during the execution of the loop. Instructions within the loop are then executed (step 74) until the loop is completed (decision block 76). Since the instructions within the loop are executed after the start of access instruction, the memory operations performed in response to these instructions are performed under the local access mode. Upon completion of the loop, a second start of access instruction may optionally be executed (step 78, shown in dashed enclosure to indicate optionality). The second start of access instruction disables the local access mode. In this manner, the global access mode again controls access modes for memory operations for the remainder of the program (not shown). If the loop is executed again during the execution of the program, steps 74, 76 and optionally 78 may be repeated.

Turning now to FIGS. 6 and 7, translation facilities employed within the x86 microprocessor architecture are shown. More particularly, a page table entry 80 defined by the page translation mechanism is shown and a memory type range register (MTRR) 82 is shown. Page table entry 80 includes a page base address and translation attributes field 84, a PCD bit 86, a PWT bit 88, and a translation attributes field 90. Fields 84 and 90 include translation information which does not affect the global access mode for the page, and will not be described further herein. The information in these fields is a well-known portion of the x86 microprocessor architecture. MTRR 82 includes reserved fields 92 and 94, as well as a base address field 96 and a memory type field 98. The reserved fields 92 and 94 are set to zero. Base address field 96 stores the base address of the memory range defined by MTRR 82.

PCD bit 86, PWT bit 88, and memory type field 98 form the global access mode for microprocessor 10. PCD bit 86, when set, defines the page as non-cacheable. When PCD bit 86 is clear, the page is cacheable. PWT bit 88 defines the page as writethrough when set (i.e. write memory accesses update data cache 14 and are propagated to the main memory immediately). When clear, PWT bit 88 indicates that the page is writeback (i.e. write memory accesses update data cache 14 and are not propagated to main memory until the corresponding cache line is discarded by data cache 14). Memory type field 98 defines the associated memory range as one of five memory types. The associated memory range for MTRR 82 is variable between 4 k and the entire memory address space. The memory range is specified in a companion MTRR (not shown). Additionally, a set of MTRRs (not shown) may be used to specify the memory type for the addresses between 0 and 7FFFF (hexadecimal).

The five memory types specifiable via memory type field 98 are uncacheable (UC), write combining (WC), writethrough (WT), writeback (WB), and write-protected (WP). The UC memory type disables storage within data cache 14 of any cache lines within the corresponding memory range. The WT and WB memory types cause write memory accesses to be performed in a writethrough or writeback fashion, respectively. Additionally, the WB memory type causes data cache 14 to fetch and store the corresponding cache line for write memory operations which miss. The WP memory type performs a writethrough operation on a cache miss and causes invalidations in caches of all microprocessors attached to microprocessor 10. Finally, the WC memory type allows write memory operations to be accumulated in a write buffer before storing the combined updates to main memory.

When taken together, PCD bit 86, PWT bit 88, and memory type field 98 form the global access mode for memory operations. If a conflict exists between memory type field 98 and PCD bit 86 or PWT bit 88, the setting of the PCD bit 86 or PWT bit 88 controls the global access mode.

Figure 8:
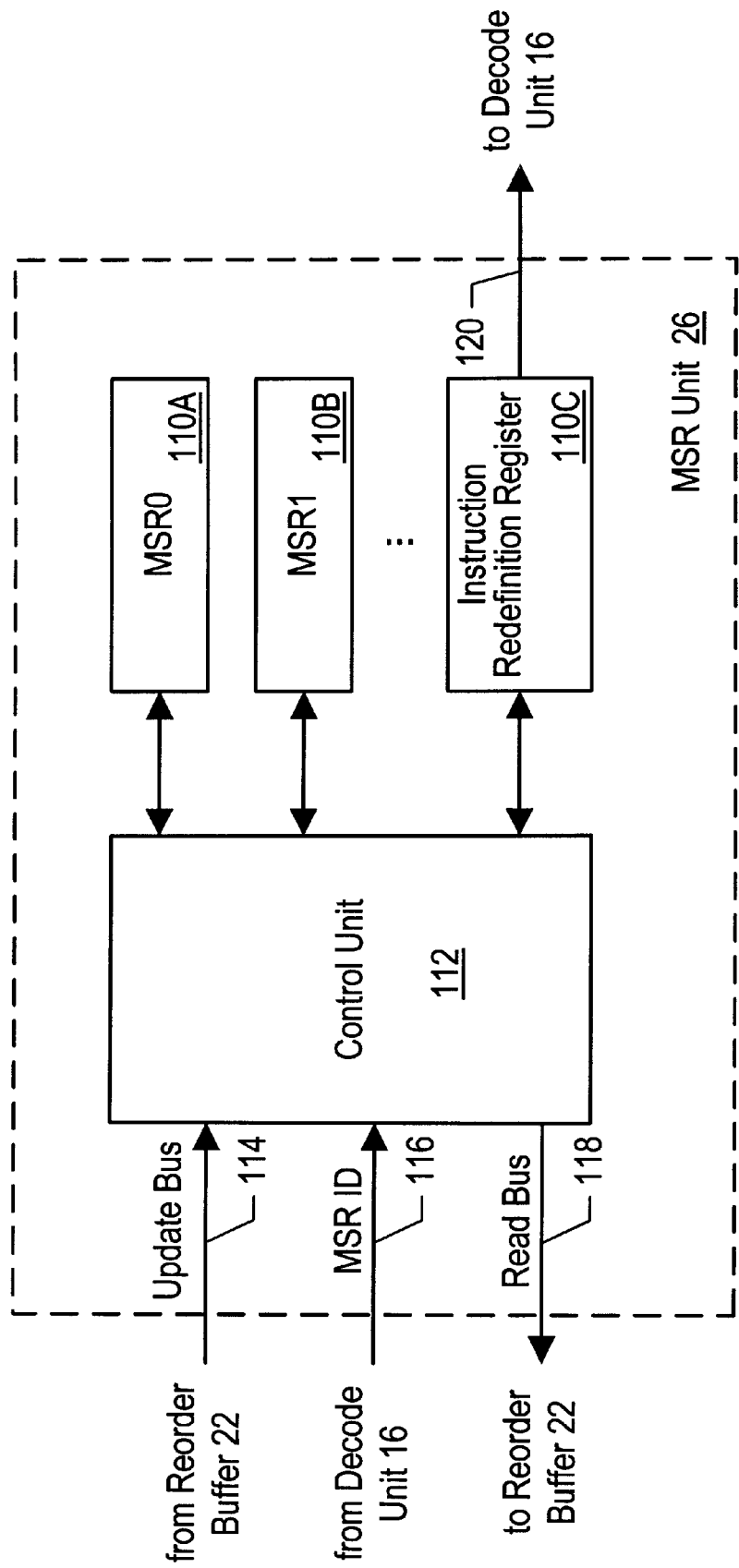
FIG. 8 is a block diagram of one embodiment of a model specific register (MSR) unit shown in FIG. 1.

Turning next to FIG. 8, a block diagram of one embodiment of MSR unit 26 is shown. MSR unit 26 includes a plurality of MSRs 110A, 110B, etc. One of MSRs 110 is shown as MSR 110C, which is labeled "instruction redefinition register" in FIG. 8. The instruction redefinition register is the MSR assigned to store instruction redefinition information. Although MSR 110C will be referred to herein as instruction redefinition register 110C, it is noted that instruction redefinition register 110C is an MSR. In other words, instruction redefinition register 110C is accessed using the read MSR and write MSR instructions (e.g. RDMSR and WRMSR in embodiments employing the x86 microprocessor architecture). One of the operands of the read MSR and write MSR instructions is a value (the MSR ID) which selects one of MSRs 110 for access. One value of the MSR ID selects MSR 110C.

A control unit 112 is shown in FIG. 8 as well. Control unit 112 is coupled to each of MSRs 110 for accessing and updating (i.e. reading and writing) MSRs 110 in response to read MSR and write MSR instructions. Control unit 112 is coupled to an update bus 114 from reorder buffer 22, an MSR ID bus 116 from decode unit 16, and a read bus 118 to reorder buffer 22.

Update bus 114 is used by reorder buffer 22 to convey an update value for an MSR, as well as an MSR ID identifying the MSR to be updated. Upon retirement of a write MSR instruction, reorder buffer 22 provides the update value generated according to execution of the write MSR instruction and the MSR ID provided as an operand of the write MSR instruction upon update bus 114. Control unit 112 updates the identified MSR 110 with the updated value.

When decode unit 16 decodes a read MSR instruction, decode unit 16 may detect the MSR ID and convey it to control unit 112 upon MSR ID bus 116. Control unit 112 accesses the identified MSR and provides the value stored in the identified MSR upon read bus 118 to reorder buffer 22. This process is similar to decode unit 16 conveying a register number to register file 24 and register file 24 providing the value stored therein to reorder buffer 22. Reorder buffer 22 either provides the value stored in the identified MSR or replaces the value with a tag or value stored in reorder buffer 22 if a dependency is detected therein.

Alternatively, the MSR ID may not be detectable by decode unit 16. For example, the RDMSR and WRMSR instructions defined by the x86 microprocessor architecture define the MSR ID as being stored in the ECX register. For such a case, MSR ID bus 116 may be coupled to execute units 18. Furthermore, read bus 118 may be part of result bus 30 in such a case.

It is noted that the write MSR instruction may be implemented as a serialized instruction (i.e. instructions prior to the write MSR instruction are completed before executing the write MSR instruction, and the write MSR instruction is completed before executing instructions subsequent to the write MSR instruction). If the write MSR instruction is serialized, then dependency checking for the MSR being read by the read MSR instruction may not be needed.

A write MSR instruction selecting instruction redefinition register 110C is used to enable instruction redefinition mode in microprocessor 10. The value stored into instruction redefinition register 110C determines which instructions are redefined as the start of access instruction. The read MSR instruction may be used to examine the contents of instruction redefinition register 110C and thereby determine whether or not the start of access instruction has been activated in place of an architected instruction.

According to one embodiment, a redefinition enable flag is stored in the status flags register employed by microprocessor 10. The redefinition enable flag is enabled to enable the use of the added instructions via instruction redefinition mode. The redefinition enable flag may be implicitly enabled by microprocessor 10 when a write MSR instruction is performed to instruction redefinition register 110C and at least one of the redefinable instructions is selected to be redefined. Similarly, the redefinition enable flag may be implicitly disabled when a write MSR instruction is executed which defines all redefinable instructions to perform their architecturally defined operations. Alternatively, application programs may be required to contain an explicit enable and disable of the redefinition enable flag.

A bus 120 is coupled between instruction redefinition register 110C and decode unit 16. Bus 120 conveys the values stored in instruction redefinition register 110C to decode unit 16. In this manner, decode unit 16 may determine which decoded instruction to produce upon decode of a redefinable instruction.

It is noted that a preselected instruction or instructions are defined as redefinable via instruction redefinition register 110C. It may be advantageous to select seldom-used instructions as redefinable instructions, since redefining a redefinable instruction as the start of access instruction disables use of the redefinable instruction. For example, privileged instructions (which cannot be executed by an application program) and instructions which perform an operation which is seldom-used by application programs may be candidates for redefinable instructions.

Figure 9:
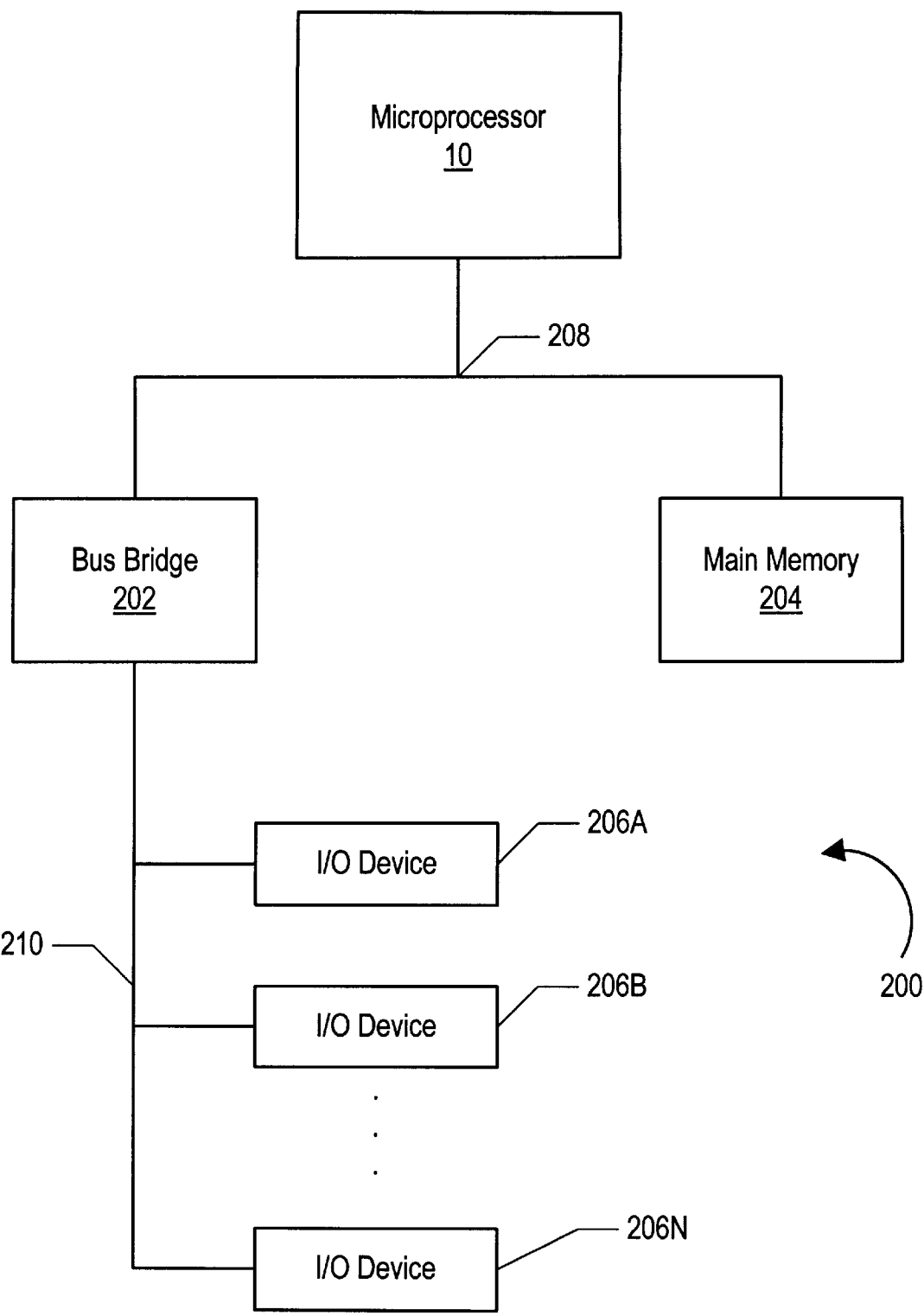
FIG. 9 is a block diagram of one embodiment of a computer system including the microprocessor shown in FIG. 1.

Turning now to FIG. 9, a computer system 200 including microprocessor 10 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 10, bus bridge 202, and main memory 204 are coupled to a system bus 208. I/O devices 206 are coupled to an I/O bus 210 for communication with bus bridge 202.

Bus bridge 202 is provided to assist in communications between I/O devices 206 and devices coupled to system bus 208. I/O devices 206 typically require longer bus clock cycles than microprocessor 10 and other devices coupled to system bus 208. Therefore, bus bridge 202 provides a buffer between system bus 208 and input/output bus 210. Additionally, bus bridge 202 translates transactions from one bus protocol to another. In one embodiment, input/output bus 210 is an Enhanced Industry Standard Architecture (EISA) bus and bus bridge 202 translates from the system bus protocol to the EISA bus protocol. In another embodiment, input/output bus 210 is a Peripheral Component Interconnect (PCI) bus and bus bridge 202 translates from the system bus protocol to the PCI bus protocol. It is noted that many variations of system bus protocols exist. Microprocessor 10 may employ any suitable system bus protocol.

I/O devices 206 provide an interface between computer system 200 and other devices external to the computer system. Exemplary I/O devices include a modem, a serial or parallel port, a sound card, etc. I/O devices 206 may also be referred to as peripheral devices. Main memory 204 stores data and instructions for use by microprocessor 10. In one embodiment, main memory 204 includes at least one Dynamic Random Access Memory (DRAM) and a DRAM memory controller.

It is noted that although computer system 200 as shown in FIG. 9 includes one bus bridge 202, other embodiments of computer system 200 may include multiple bus bridges 202 for translating to multiple dissimilar or similar I/O bus protocols. Still further, a cache memory for enhancing the performance of computer system 200 by storing instructions and data referenced by microprocessor 10 in a faster memory storage may be included. The cache memory may be inserted between microprocessor 10 and system bus 208, or may reside on system bus 208 in a "lookaside" configuration. It is still further noted that the functions of bus bridge 202, main memory 204, and the cache memory may be integrated into a chipset which interfaces to microprocessor 10.

In accordance with the above disclosure, a microprocessor has been shown which provides a start of access instruction. The start of access instruction may be used to establish a local access mode which is efficient for a particular code sequence within a program, but which may not be efficient for the program as a whole. Advantageously, performance of the particular code sequence and/or the program as a whole may be increased by including the start of access instruction prior to initiating the particular code sequence.

Numerous variations and modifications will become apparent to those skilled in the art once the above disclosure is fully appreciated. It is intended that the following claims be interpreted to embrace all such variations and modifications.

What is claimed is:

1. A method for providing specialized fetching of memory operands for a particular code sequence executed in a microprocessor, comprising:

executing a start of access instruction within said microprocessor prior to executing said particular code sequence, wherein said start of access instruction provides a local access mode indicative of a memory access pattern within said particular code sequence;

generating an access mode corresponding to a particular memory operation within said particular code sequence from said local access mode and a global access mode corresponding to a page containing an address of said particular memory operation;

determining a cache policy corresponding to said address in response to said access mode; and fetching memory operands specified by said particular code sequence during said executing said code sequence in response to said access mode.

2. The method as recited in claim 1 further comprising fetching memory operands in response to said global access mode prior to said executing.

3. The method as recited in claim 2 further comprising executing another start of access instruction after executing said particular code sequence, whereby said local access mode is deactivated.

4. The method as recited in claim 1 wherein said fetching memory operands in response to said access mode comprises determining if a particular memory operand is to be stored into a data cache of said microprocessor if an access to said data cache for said memory operand is determined to miss said data cache.

5. The method as recited in claim 4 wherein said access mode comprises a streaming data indication, and wherein said fetching memory operands in response to said access mode comprises storing said memory operands into a line buffer but not into said data cache if said streaming data indication is in an enabled state.

6. The method as recited in claim 4 wherein said access mode comprises a write once indication, and wherein said fetching memory operands in response to said access mode comprises storing write memory operands which miss said data cache to a main memory connected to said microprocessor if said write memory operands miss said data cache and said write once indication is in an enabled state.

7. The method as recited in claim 4 wherein said access mode comprises a write/use indication, and wherein said fetching memory operands in response to said access mode comprises storing write memory operands into said data cache for use by subsequent read memory operations if said write/use indication is in an enabled state.

8. The method as recited in claim 4 wherein said access mode comprises a stride indication, and wherein said fetching memory operands in response to said access mode comprises prefetching said memory operands into said data cache in response to a stride value provided by said start of access instruction if said stride indication is in an enabled state.

9. A microprocessor comprising:

a data cache for storing data; and a load/store unit coupled to said data cache, wherein said load/store unit is configured to convey an address and an access mode corresponding to a memory operation to said data cache, and wherein said access mode determines a cache policy corresponding to said address, and wherein said load/store unit is configured to generate said access mode in response to a global access mode corresponding to a page containing said address and a local access mode provided by a start of access instruction.

10. The microprocessor as recited in claim 9 wherein said local access mode is indicative of a memory access pattern within a particular code sequence of a program.

11. The microprocessor as recited in claim 10 wherein said local access mode comprises a streaming data indication.

12. The microprocessor as recited in claim 10 wherein said local access mode comprises a write once indication.

13. The microprocessor as recited in claim 10 wherein said local access mode comprises a write/used indication.

14. The microprocessor as recited in claim 10 wherein said local access mode comprises a stride indication.

15. A load/store unit for performing memory operations to a data cache, comprising:

an access mode control register configured to store a local access mode indicative of a memory access pattern within a particular code sequence, wherein said local access mode is stored into said access mode control register in response to a start of access instruction included within said particular code sequence; and an access mode generation unit coupled to said access mode control register and coupled to receive a global access mode corresponding to a page containing an address of a particular memory operation, wherein said access mode generation unit is configured to generate an access mode corresponding to said particular memory operation from said local access mode and said global access mode, and wherein said access mode determines a caching policy corresponding to said address.

16. The load/store unit as recited in claim 15 wherein said access mode corresponds to said local access mode unless said local access mode violates a restriction imposed by said global access mode.

17. The load/store unit as recited in claim 15 wherein one encoding of said local access mode is a disabled encoding, and wherein said access mode generation unit is configured to generate said access mode corresponding to said global access mode if said local access mode comprises said disabled encoding.

18. The load/store unit as recited in claim 15 further comprising a line buffer coupled to said access mode generation unit, wherein said line buffer is configured to store cache lines excluded from said data cache in response to said local access mode.

* * * * *